UNITED STATES PATENT OFFICE.

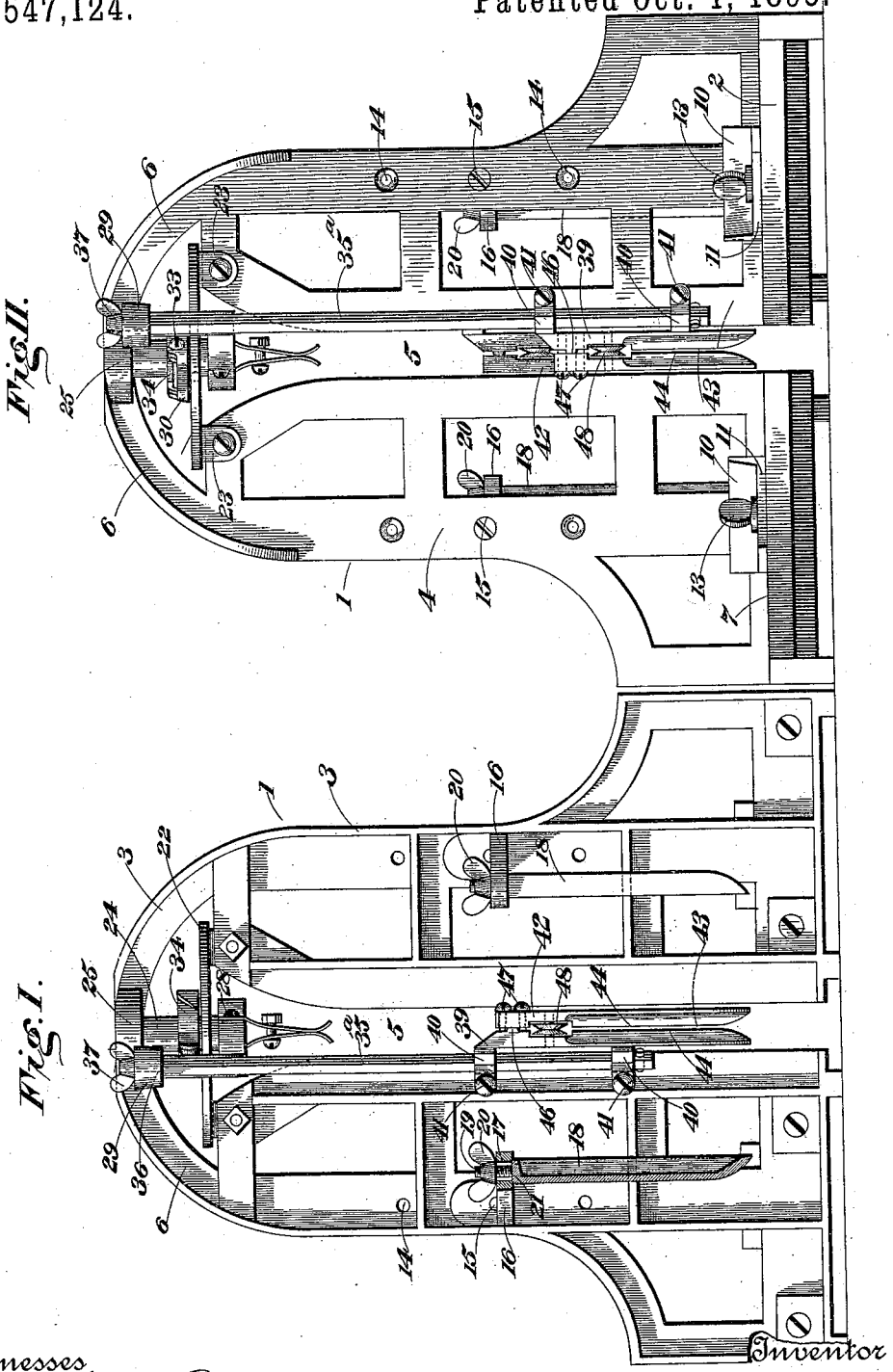

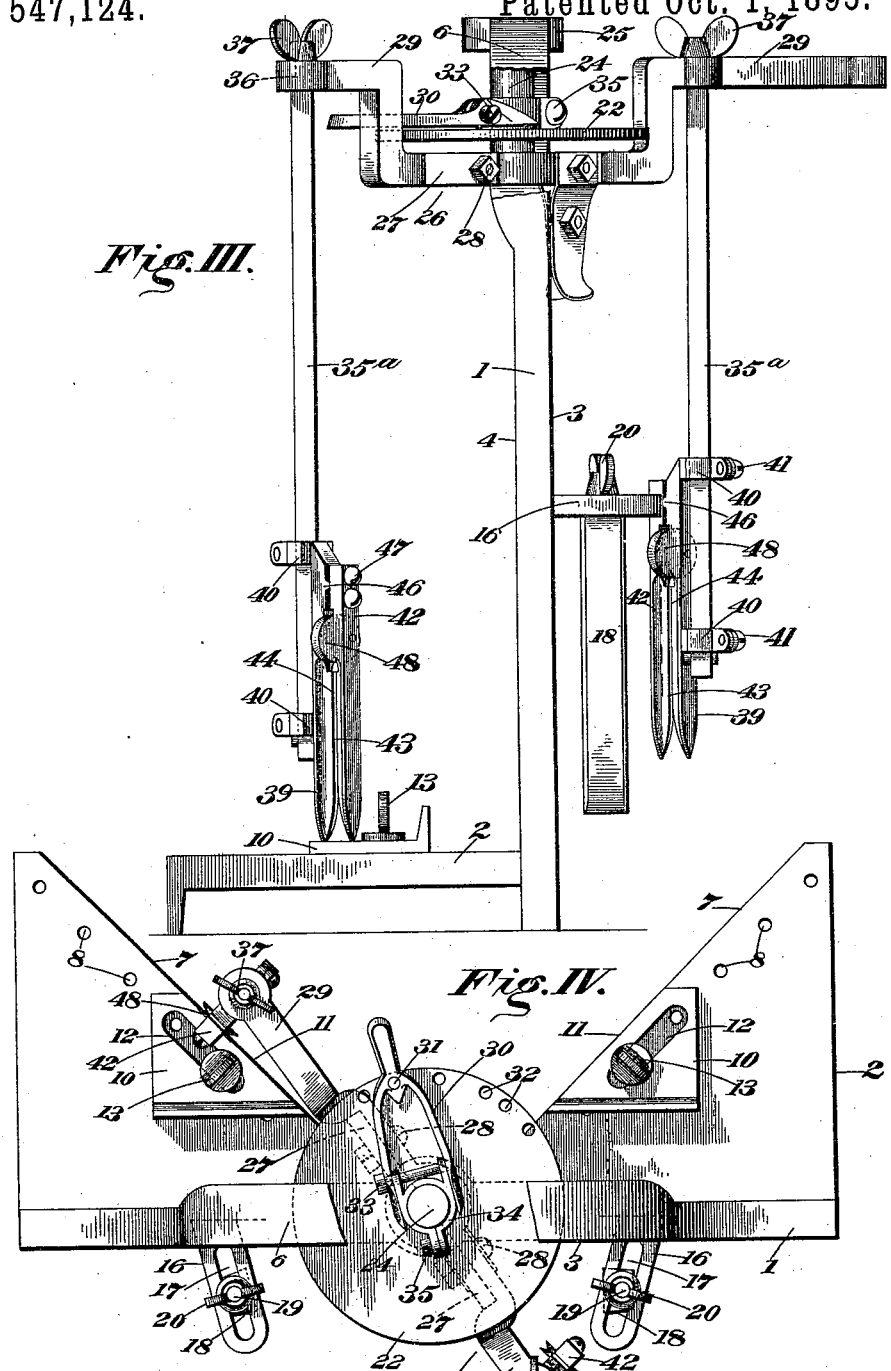

JAMES LOCKE, OF DAYTON, OHIO.

MITER-MACHINE.

SPECIFICATION forming part of Letters Patent No. 547,124, dated October 1, 1895.

Application filed October 9, 1894. Serial No. 525,379. (No model.)

*To all whom it may concern:*

Be it known that I, JAMES LOCKE, of Dayton, county of Montgomery, State of Ohio, have invented certain new and useful Improvements in Miter-Machines, of which the following is a specification, reference being had to the accompanying drawings.

The object of my invention is to produce an improved machine for holding the material to be cut, irrespective of its shape, within certain limits of dimension, and for directing the swing of a cutting-instrument—as, for example, a saw—at a required angle.

In the accompanying drawings, Figure I is an elevation looking toward the machine from one side. Fig. II is a similar view looking at it from the other side. Fig. III is an end elevation, and Fig. IV is a top plan view.

Referring to the figures on the drawings, 1 indicates the upright frame-piece of my device, and 2 the base thereof. The upright frame-piece is provided on opposite sides with trued surfaces 3 and 4, respectively. The frame-piece is preferably bifurcated and provided with a medial vertical sawway 5, the two parts of the frame being united, as by an integral arch 6. The base 2, although described as a single part, as indeed it is in effect, is made of two pieces joined, respectively, to the two parts of the frame. The two pieces of the base are preferably triangular in shape, each having an oblique side 7, which, when the base-pieces are in place, converge toward the sawway and allow any angular adjustment in the sweep of the saw.

At suitable distances from the oblique sides 7 is arranged on each base-piece a series of holes 8. Each series is designed for the adjustment of a clamp-piece 10, having an oblique guide-face 11, by which it may be set in alignment with respect to the oblique sides 7. The adjusting mechanism preferably consists of a slot 12, parallel to the guide-face 11, through which is passed the shank of a thumb-bolt 13. The holes 8 may be internally screw-threaded to receive the externally screw-threaded shank of the thumb-bolt 13, or they might be made smooth and the thumb-bolt be screwed into a separate nut underneath the base-piece. It will be understood that by this arrangement the clamps may be respectively set to any one of the series of holes 8, and that when so placed each is susceptible of an additional adjustment by means of the thumb-bolt 13 and the slot 12. The clamps 10 are especially adapted for holding wide pieces of material to be cut, but are not well adapted for thin pieces. For holding such work I prefer to employ other clamping mechanism, which is conveniently operated upon the other side of the upright frame-piece. For this purpose I employ in the frame-piece two vertical rows of holes 14, to any of which, as by screws 15, angular brackets 16 may be adjusted. The arms of these brackets preferably converge and are provided, respectively, with slots 17.

18 indicates each of two clamping-arms that is preferably provided with a screw-threaded shank 19, upon which a thumb-nut 20 screws. By the action of the thumb-nut the shoulder 21 of the clamping-arm is drawn tight against the bottom of the bracket-arm and the clamp-arm is firmly secured in place. An adjustment to or from the upright frame-piece may be effected by loosening the nut and securing it at any desirable position upon the bracket-arm.

22 indicates an adjustment bearing-plate that is preferably provided with lugs 23, by means of holes in which and in the upright frame-piece the plate may be rigidly secured to the upper part of the frame-piece, immediately underneath the arch 6. The purpose, in part, of the plate 22 is to afford a low bearing for a journal 24, whose upper bearing 25 is provided in the center of the arch 6. By this arrangement the journal is rigidly secured in the vertical position and affords a true and firm revoluble support for the swinging frame 26, that is firmly secured to its lower end. A preferable means of securing it in place consists of kerfs 27, whose sides may be drawn to clamp the journal 24 by draw bolts and nuts 28.

The swinging frame is substantially U-shaped, as illustrated, with elevated branching arms 29 on opposite sides, so as to render available the full height of the upright frame. The swinging frame may be set at any required angle by a catch-lever 30, that has a depending pin 31, adapted to enter properly-arranged holes 32 in the plate. This catch-lever may be fastened by a screw 33 to a split collar 34, that is designed to be secured to the journal by a draw-screw 35. The set-collar also serves to support the journal 24 within its bearing by preventing it from slipping downwardly. The swinging frame carries depending tracks 35ª, which are preferably squared and may be secured in suitable holes 36 in the arms 29. For this purpose the tracks are preferably rounded at their upper ends and externally screw-threaded, the holes 36 in the swinging frame being preferably screw-threaded to fit them. Lock-nuts 37 are adapted to screw upon their upwardly-projecting ends to hold them in fixed positions in the arms.

39 indicates one half of a saw-guide, which, as by internally-screwed split collars 40, closed by screws 41, is movably secured, respectively, upon the track 35ª.

42 indicates the other half of the saw-guide, which, joined to the other half, is designed to leave a thin slit 43 between the two halves for the reciprocation of the cutting-instrument or saw-blade. The opposite faces of the saw-guide halves are thinned to an edge 44 in order that they may oppose the least resistance to the travel of the saw. It is also desirable that the slit should be adjustable to different thicknesses of saws. For the purpose of such adjustment a bridge 46 upon one of the halves may be employed, while screws 47 upon opposite sides of the bridge, passing through one of the halves and screwing through the other half, may be used. It may be readily perceived that the preponderant tension of one or the other screws will control the width of the slit 43. Upon the slit in suitable recesses 47 an antifriction grooved roller 48 is preferably journaled.

What I claim is—

1. In a miter machine, the combination with a base and upright frame piece provided with a medial saw way, of vertically adjustable cutting mechanism and clamps located, respectively, upon the front and rear sides of the upright frame piece for clamping the material to be cut against the opposite sides of the said frame piece, substantially as specified.

2. In a miter machine, the combination with a base, upright frame piece trued on the front and rear sides and having a medial saw way, of miter cutting mechanism, and adjustable clamps adapted to clamp the material to be cut against either the front or rear sides of the frame piece, substantially as specified.

3. In a miter machine, the combination with a base and upright frame piece, of horizontally adjustable clamps upon the base adapted to clamp the material to be cut against the front side of the upright frame piece, and vertically adjustable clamps upon the rear side of the frame piece and adapted to clamp the material to be cut against said rear side of the upper frame piece, substantially as specified.

4. In a miter machine, the combination with an upright frame piece provided with a medial saw-way and with a swinging frame adapted to carry a cutting instrument, of laterally, horizontally adjustable clamps adapted to clamp the material to be cut against the front side of the upright frame piece, vertically adjustable brackets upon the rear side of the upright frame piece, and clamps horizontally adjustable upon said brackets, substantially as specified.

5. In a miter machine, the combination with an upright frame piece, saw-way and cutting mechanism, of a base provided with a series of screw threaded apertures, a bolt adapted to be screwed therein, and a clamp provided with a clamping edge parallel to the upright frame piece and provided with an elongated slot at an angle thereto designed to be engaged by the bolt, substantially as specified.

6. In a miter machine, the combination with a frame consisting of two upright parts united by an arch, of a bearing plate rigidly secured to the upright parts below the arch, a journal secured in suitable bearings in the arch and bearing plate, respectively, and provided upon its extremity immediately below the bearing plate with a swinging frame entirely below the arch, and a split collar secured to the journal immediately above the bearing plate, the swinging frame and collar being secured to said journal below and above the bearing plate, respectively, serving thereby to prevent longitudinal movement of the journal in either direction, substantially as specified.

7. In a miter machine, the combination with a frame consisting of two upright parts united by an arch, of a bearing plate secured to the upright parts below the arch, a journal secured in suitable bearings in the arch and bearing plate respectively, and provided upon its extremity immediately below the bearing plate with a swinging frame entirely below the arch, and a split collar secured to the journal immediately above the bearing plate, the swinging frame and collar being secured to said journal below and above the bearing plate, respectively, serving thereby to prevent longitudinal movement of the journal in either direction, and a catch lever pivoted to the collar provided with a handle extending beyond the periphery of the bearing plate, and provided with a lug adapted to enter the apertures in said bearing plate to lock the swinging frame at the desired angle, substantially as specified.

8. In saw guides for miter machines, the combination of two united parts, and an intermediate bridge, of screws adapted to fasten the parts together and located upon opposite sides of the bridge for the purpose of adjusting the width of the slit between the parts, substantially as set forth.

In testimony of all which I have hereunto subscribed my name.

JAMES LOCKE.

Witnesses:
GRACE ANDREWS,
B. F. HENHEY.